United States Patent
Yang et al.

(10) Patent No.: US 11,194,929 B2
(45) Date of Patent: Dec. 7, 2021

(54) RISK IDENTIFICATION OF PERSONALLY IDENTIFIABLE INFORMATION FROM COLLECTIVE MOBILE APP DATA

(71) Applicant: INJE UNIVERSITY INDUSTRY-ACADEMIC COOPERATION FOUNDATION, Gimhae-Si Gyeongsangnam-do (KR)

(72) Inventors: Jinhong Yang, Gimhae-Si (KR); Chui Soo Kim, Gimhae-Si (KR); Nam Yong Lee, Gimhae-Si (KR); Md Mehedi Hassan Onik, Gimhae-Si (KR)

(73) Assignee: INJE UNIVERSITY INDUSTRY-ACADEMIC COOPERATION FOUNDATION, Gimhae-Si (KR)

( * ) Notice: Subject to any disclaimer, the term of this patent is extended or adjusted under 35 U.S.C. 154(b) by 280 days.

(21) Appl. No.: 16/459,938

(22) Filed: Jul. 2, 2019

(65) Prior Publication Data
US 2020/0050789 A1     Feb. 13, 2020

(30) Foreign Application Priority Data

Aug. 13, 2018    (KR) ........................ 10-2018-0094508
Oct. 31, 2018    (KR) ........................ 10-2018-0131607

(51) Int. Cl.
    *G06F 21/62*         (2013.01)
(52) U.S. Cl.
    CPC ............................... *G06F 21/6245* (2013.01)

(58) Field of Classification Search
    CPC .................................................. G06F 21/6245
    See application file for complete search history.

(56) References Cited

U.S. PATENT DOCUMENTS

| | | | |
|---|---|---|---|
| 9,582,668 B2* | 2/2017 | Bettini | .............. G06F 21/57 |
| 2012/0116839 A1* | 5/2012 | Akkiraju | ............. G06Q 10/06 |
| | | | 705/7.28 |
| 2014/0214610 A1* | 7/2014 | Moshir | ............ G06Q 20/4016 |
| | | | 705/26.35 |
| 2016/0044049 A1* | 2/2016 | Xing | ............... H04L 63/14 |
| | | | 726/23 |
| 2019/0266355 A1* | 8/2019 | Lockhart, III | ...... H04L 63/1433 |

FOREIGN PATENT DOCUMENTS

KR     1020130021892 A     3/2013

\* cited by examiner

*Primary Examiner* — Harris C Wang
(74) *Attorney, Agent, or Firm* — Hayes Soloway P.C.

(57) ABSTRACT

Big data analytics is being used by many market participants. PII (Personally Identifiable Information) (e.g., age, race, social security number, address, etc.) plays a vital role in providing user-centric services. Many IT companies collect, store and process PII of their customers by means of various mobile applications. The example embodiments may explain how collective permission gathering through multiple Android applications by same publishers can disclose user's PII by using two new PII risk factors, and determine total risk factor for PII.

10 Claims, 11 Drawing Sheets

RISK IDENTIFICATION OF PERSONALLY IDENTIFIABLE INFORMATION FROM COLLECTIVE MOBILE APP DATA

This application claims the priority benefit of Korean Patent Application No. 10-2018-0094508, filed on Aug. 13, 2018 and Korean Patent Application No. 10-2018-0131607, filed on Oct. 31, 2018, in the Korean Intellectual Property Office, the disclosure of which is incorporated herein by reference.

BACKGROUND

1. Field of the Invention

The present disclosure relates to risk identification of personally identifiable information from collective mobile app data.

2. Description of Related Art

In today's data driven digital economy, user-related information works as oil to run this world. Users are providing privacy information willingly or unwillingly to the well-known or unknown service providers. Privacy information often reveals one's PII (Personally Identifiable Information). Many researchers have identified mobile apps as a great source of privacy leaking in the digital world. Many mobile apps collect user's sensitive information during installation, usage, and uninstallation. Apps permission authenticity and reliability have faced the questions from time to time by several researchers. There is a report that the global annual economic loss caused by the data leaking would be over 2.1 trillion USD by 2019.

A study stated 87% of the USA population are highly identifiable by using only 5-digit zip, sex, date of birth. Nowadays, people are getting conscious of securing PII as an asset but still, apps are demanding excess permission and some of requested permissions are irrelevant to basic purpose. As of 2018, total android and apple users are 2 and 1.3 billion with 2.8 and 2.2 million apps, respectively. KISA (Korean Internet and Security Agency)'s surveyed common opinion about information security and found two main public concerns on permissions requested by apps; 'undesired and imprudent collection of PII is 33.3%', and 'illicit use of collected PII is 27.6%'. A tech-security company Gemalto's BLI (Breach Level Index) revealed that an avg. 10.4 million PII evidence are exposed each day where 74% were identity theft.

To deal with such problems, many countries and organizations initiated to reduce personal data breaching. For instance, EU-GDPR (European General Data Protection Regulation), Australia's Privacy Amendment, Personal Information Protection and Electronic Documents Act by Canada, ISO27001 by International Organization for Standardization have been proposed to control personal data collection process. Up to 2% of total revenue or 20 million euro to any organizations may be fined if they fail to protect PII. GDPR mainly focuses violation notification, right to access, right to be forgotten, data movability, and privacy by design and information security officer. From Android version 8.1 (API level 27 and higher), there are three (normal, signature and dangerous permission) protection levels that affects third-party app data access and collections. Several studies also show that personal data leak through privacy permission request by apps. Since data volume and source are increasing rapidly, preventive action should be more drastically required. In designing preventive, personal data leaking by inter-publisher or organization data distribution for PII gathering should be seriously considered.

SUMMARY

At least one example embodiment may explain how collective permission gathering through multiple Android applications by same publishers may disclose user's PII by using two new PII risk factors, and provide a risk identification method for determining total risk factor for PII, a computer device performing the risk identification method, a computer program connected with the computer device and stored in computer readable recording medium to execute the risk identification method in the computer device and the recording medium.

A risk identification method for PII (Personally Identifiable Information) comprises generating a profiling chart for identifying an application having privacy permission for PII and PPII (Potential Personally Identifiable Information); collecting privacy permission of an application identified through the profiling chart; identifying a first risk factor through total PPII collected by publisher of the application identified through the profiling chart; and identifying a second risk factor through total PPII collected by parent organization of the publisher; and determining total risk factor based on the first risk factor and the second risk factor.

According to an aspect of at least one example embodiment, the generating a profiling chart may generate the profiling chart for identifying an application having privacy permission corresponding to dangerous permission among normal, signature, and dangerous permission which are three protection levels affecting third-party app data access and collections in Android OS.

According to another aspect of at least one example embodiment, the identifying a first risk factor may determine the total number of PPII given to applications included in an application group by a first user of a set of users as the first risk factor for the first user.

According to another aspect of at least one example embodiment, the identifying a second risk factor may determine the sum of the total number of PPII given to applications of the parent organization by the first user of the set of users and the total number of PPII given to applications of the publisher which is a sub-organization of the parent organization by the first user as the second risk factor for the first user.

According to another aspect of at least one example embodiment, the determining total risk factor may determine the total risk factor based on error rate as the first risk factor, the second risk factor, and other influence factors.

It is provided a computer program connected with a computer device and stored in a computer readable recording medium to execute the risk identification method in the computer device It is provided a computer readable recording medium in which a computer program for executing the risk identification method in a computer device is recorded.

A computer device comprising at least one processor implemented to execute a computer readable instruction, and the computer device, by the at least one processor, generates a profiling chart for identifying an application having privacy permission for PII (Personal Identification Information) and PPII (Potential Personally Identifiable Information), collects privacy permission of an application identified through the profiling chart, identifies a first risk factor through total PPII collected by publisher of the application identified through the profiling chart, identifies a second factor through total PPII collected by parent organization of the publisher, and determines total risk factor based on the first risk factor and the second risk factor.

According to example embodiments, it may explain how collective permission gathering through multiple Android applications by same publishers may disclose user's PII by using two new PII risk factors, and determine total risk factor for PII.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Figure 1:
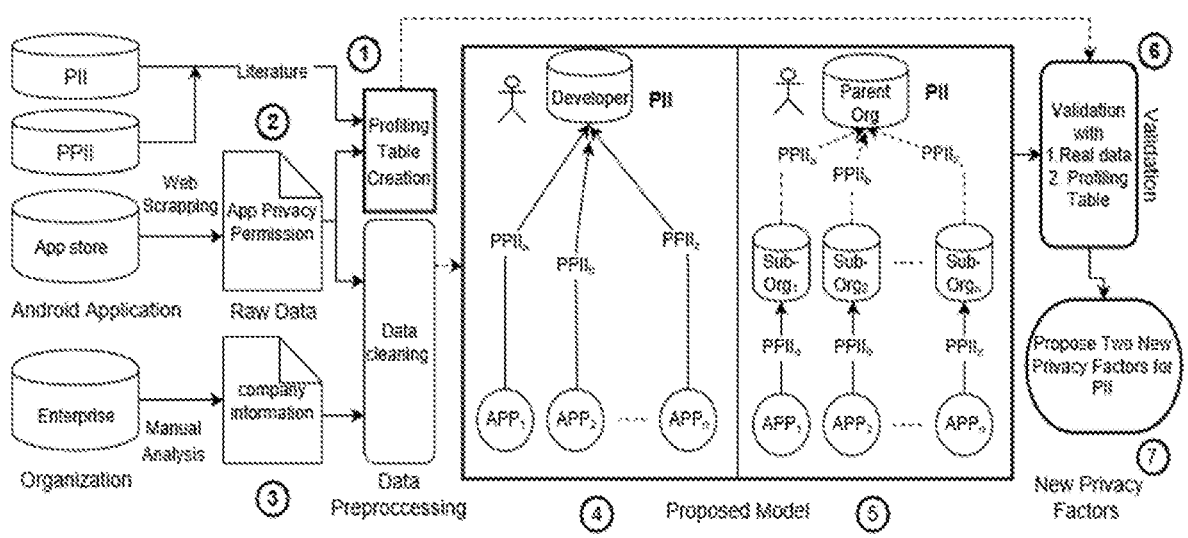
FIG. 1 is a drawing Illustrating overview of risk identification method proposed according to an example of embodiments.

Hereinafter, some example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments.

Many market participants are using big data analytics to utilize personal data in their business applications. PII (Personally Identifiable Information) (e.g., age, race, social security number, address, etc.) plays a vital role in providing user-centric services. Many IT companies collect, store and process PII of their customers by means of various mobile applications. The example embodiments explain how collective permission gathering through multiple Android applications by same publishers may disclose user's PII by using two new PII risk factors. To evaluate the usefulness of the proposed risk factors, in an example of embodiments, experiments are conducted with 625 dangerous permissions (e.g., 'read location', 'read and write contacts', 'use camera', 'use microphone', etc.) listed by Android. The data flow is graphically outlined and the critical statistical evidence is identified. Through experimental data analysis, it is evident that the proposed PII risk factors hold definite advantages over other risk factors which only consider single way of data leaking. The experimental results suggest that PII like Google ID, location, phone number and social graph are at peril if collective permission gathering through multiple Android apps are not appropriately measured and controlled.

1. Background Studies

A. PII (Personally Identifiable Information) and PPII (Potential Personally Identifiable Information)

In privacy, several studies have identified digital identifiers as a source of the user identifier. Pfitzmann and Hansen defined PII as "An ID is any subset of attribute values of an individual person which sufficiently identifies this individual person within any set of persons". He also stated that a personal ID is not limited to a single number, combining partial IDs may generate a complete ID. Therefore, the example embodiments introduce the concept of partial ID or PPII by defining it as "A partial ID is a subset of attribute values of a compete ID". And here, the complete ID is the union of all attribute values of all IDs of this person. NIST (National Institute of Standards and Technology) defines any information about an individual maintained by an agency, including any information (name, social security number, date and place of birth, mother's maiden name, or biometric records) that may be used to distinguish or trace an individual's ID, and also defines (linked PII or PPII) any other information that is linked or linkable to an individual, such as medical educational, financial, and employment information. IP address of a user itself doesn't reveal any ID but it may link a user. Therefore, IP address is PPII, not PII. Table 1 presents a list of PII and PPII collected from several organizations and literatures.

TABLE 1

| Personally Identifiable Information (PII) | Potential Personally Identifiable Information (PPII) |
| --- | --- |
| Driving license info, fingerprints, handwriting, credit card info, digital identity, birth date, birthplace, genetic info, telephone number, login name, financial account or credit card info, full name, address, email, national identification number (NID), vehicle registration plate, social security number (SSN), taxpayer ID number, patient identification number, passport number, | workplace, grades, part of name, country, state, postcode, city, age, gender or race, school, salary, job position, criminal record, web cookie, few digits of SSN, food place, weight, employment info, medical info, blood pressure rate, education, financial info, religious view, supported team, living area, preferred music, IP address, place of birth, race |

B. ID Management, Risk and Detection Approaches

Several studies have investigated issues of personal data leaking in android apps and listed a set of risky apps to warn the users to analyze their data collection frequency. Peng and Gates blamed app developers by detecting that android apps data collection architecture is no justified with an actual purpose. Bao and Lo recommended an android app (F-droid) to assess API (Application Program Interface) used by apps. F-droid used Naive Bayes multinomial classification techniques for prediction. Another study proposed new anonymization techniques to effectively protect user privacy. Stowaway used static study to get APIs utilized in applications, to build a permission map from Android OS (operating System) and/or stack. Software, Pscout used the same method to investigate Android OS to map permissions and found 22% permissions unnecessary. Fritsch and Nurul proposed a model for PII Identification and used the model in finding that phone never sleeps to gather PII. Android increases its privacy and security issues by updating permission gathering style in latest API. Latest version needs runtime permissions from users. On the contrary, in the previous version, if a user allows one dangerous permission, the app may get rest of permission group by itself. Still, install-time permissions generation are available and half of Android users are using those versions. Since only 56% android users use Android 6.0 (API 23) higher which use runtime permission, remaining 44% uses Android 5.1.1 (API 22) or lower which permit each 'dangerous permissions' for the app at the time of install. In the example embodiments, those dangerous permissions will only be focused not normal or signature among normal, signature, and dangerous permission which are three protection levels. Table 2 presents an example of dangerous permissions listed by android.

TABLE 2

| Permission Group | Permissions |
| --- | --- |
| Calendar | Read and Write Calendar |
| Camera | Camera |
| Contacts | Read, Write and Get Contacts |
| Location | Access Fine and Coarse Location |
| Microphone | Microphone |
| Phone | Read Phone State, Numbers, Call Phone, Answer Phone Calls, Read Call Log, Write Call Log, Add Voice Mail, Use SIP, Process Outgoing Calls |
| Sensors | Body Sensors |
| SMS | Send SMS, Receive SMS, Read SMS, Receive WAP PUSH, Receive MMS |
| Storage | Read and Write External Storage |

Song and Son found mostly five concerns related to app permissions, information privacy and information security: a) persistent access to apps to local resources, b) having more permissions than needed, c) hidden agenda for data collection, d) personal data request unrelated to apps actual purpose, e) lack of awareness from app developers. The same study stated three main reasons by analyzing five data breaching cases occurred in South Korea are a) illicit dealing in customer information, b) lack of staff supervision, and c) information handling failure. Onik classified several networks initiated privacy attacks in another study. These kinds of taxonomy help to differentiate the attack and prepare accordingly. In Korea, top level mobile application service companies had data breaching record in past so these cases were chosen to be analyzed.

The example embodiments will show that the exchange among same publishers and organization may reach those publishers or organizations to identify PII of any user by collecting more information. Here, the 'publishers' are companies who release apps on app store, whereas the 'organization' are their owner.

2. Risk Identification Method

In the example embodiments, a risk factor identification model by the means of PII and PPII breaching due to the Android app privacy permission is proposed. First, Table 3 presents a profiling table (privacy permission and android application) generated from the previous discussion related to app permission, PII and PPII, and Table 1 and Table 2.

TABLE 3

| PII and PPII | Privacy Permission Application |
| --- | --- |
| Current Location | Fine_Location, Read_Ext_Storage, Calendar, Camera |
| Biometric Information | Camera, Body_Sensor, Use_Fingerprint, Access_Audio |
| Phone Number | Acess_Location, Cell_Phone, Send Sms, Get_Accounts |
| Social Graph | Read_Contacts, Process_Outgoing_Calls, Process_Incoming_Calls, Access_Fine_Location, Read_Sms, Read_Call_Log |
| Address or Area of Living | Read_Callendar, Read_Ext_Storage, Acces_Location, Cell_Phone, Send_Sms |
| Workplace | Read_Call_Log, Access_Location, Read_External_Storage |
| Google ID | Get_Accounts, Phone_Number |

Also, the example embodiments may be further extended by identifying the overall risk factors of android app permission.

A. Overall Workflow of the Proposed Model

FIG. 1 is a drawing Illustrating overview of risk identification method proposed according to an example of embodiments. FIG. 1 shows an overview of the proposed risk identification method. This process may be listed in sequence as ① to ⑦ of FIG. 1.

① Profiling table generation: PII and PPII may be reviewed in Table 1. Afterwards, comparing those with apps privacy permission from table 2, a profiling chart, table 3 may be made.

② Application privacy permission collection: Collection of privacy information of apps may be done by web scraping or web crawling. Dangerous permissions, publishers may be stored in excel.

③ Parent organization information collection: If corresponding information is received or not received from individual app store operator, a collection and process of information for app service providers in app store (e.g., play store) may be done, and corresponding information may be stored.

④ Gathering of PPII by identical application publisher: After preprocessing and analysis, collection of permission related to total PPII collected by a single publisher is done (risk factor 1).

⑤ Gathering of PPII by identical application developing organization: Total PPII collected by the parent organization of app publishers are done (risk factor 2).

⑥ Validation of real data and profiling table: A detailed analysis is done to find insights (e.g.: risk of user information collection through multiple apps in a single user environment) from gathered data by comparing with profiling Table 3 for validation.

⑦ Propose two new factors for PII security: Finally, two new PII and PPII breaching factors through android apps privacy permission are acknowledged.

B. Create Profiling Table

Table 3 presents PII and PPII and associated android permissions usually collected by the Android app. The example embodiments only considers dangerous permission that is vital for almost all apps as a pre-requisite of installation of apps. Every Android user must provide few of them to use the app.

C. Gathering of PII by Identical Application Publishers

For using an app, permission for sensitive personal information (PII or PPII) is needed. In the market, millions of app are there from thousands of publishers. Users that have given more of PPII on apps they download from a particular publisher have also higher chance of exposing their PII. That is, a set of the users may be defined as $U_1$ to $U_n$, a set of PPII consist with dangerous app permission of a user U may be termed as $PPII_1$ to $PPII_n$. A set of app publisher are set as $Pub_1$ to $Pub_n$, and it is supposed that a group of apps from android play store are $App_1$ to $App_n$. Regarding above conjecture, if a set of information given to a particular app publisher $Pub_1$ is $PPII_{dev1}$ to $PPII_{dev2}$ through $App_1$ to $App_1$ where $PPII_{dev1}$ gets all $PPII_1$ to $PPII_n$, The $Pub_1$ is highly likely to generate PII of user $U_1$ by profiling. The total number of PPII given by a user $U_1$ may be computed by the following Formula 1. Therefore, the example embodiments may identify that as the first factor ternmed as F1 from Formula 1. In other words, according to the first proposition, total PPII provided to publishers Pubs by user $U_1$ may be as below Formula 1

$$\Sigma_{App=1}^{App=n} PPII \qquad \text{[Formula 1]}$$

It is supposed that if the probability of breaching individual PII through app permeation $App_1$ to $App_n$ to $Pub_1$ to $Pub_n$ are $P_a(A), P_b(B), P_c(C) \ldots P_n(N)$. Then, the probability of breaching a particular PII due to collective app permission may be distributed as "$P_a(A)+P_b(B)+P_c(C)+ \ldots +P_n(N)$" or "$P_a(A) \cup P_b(B) \cup P_c(C) \cup \ldots \cup P_n(N)$".

Figure 2:
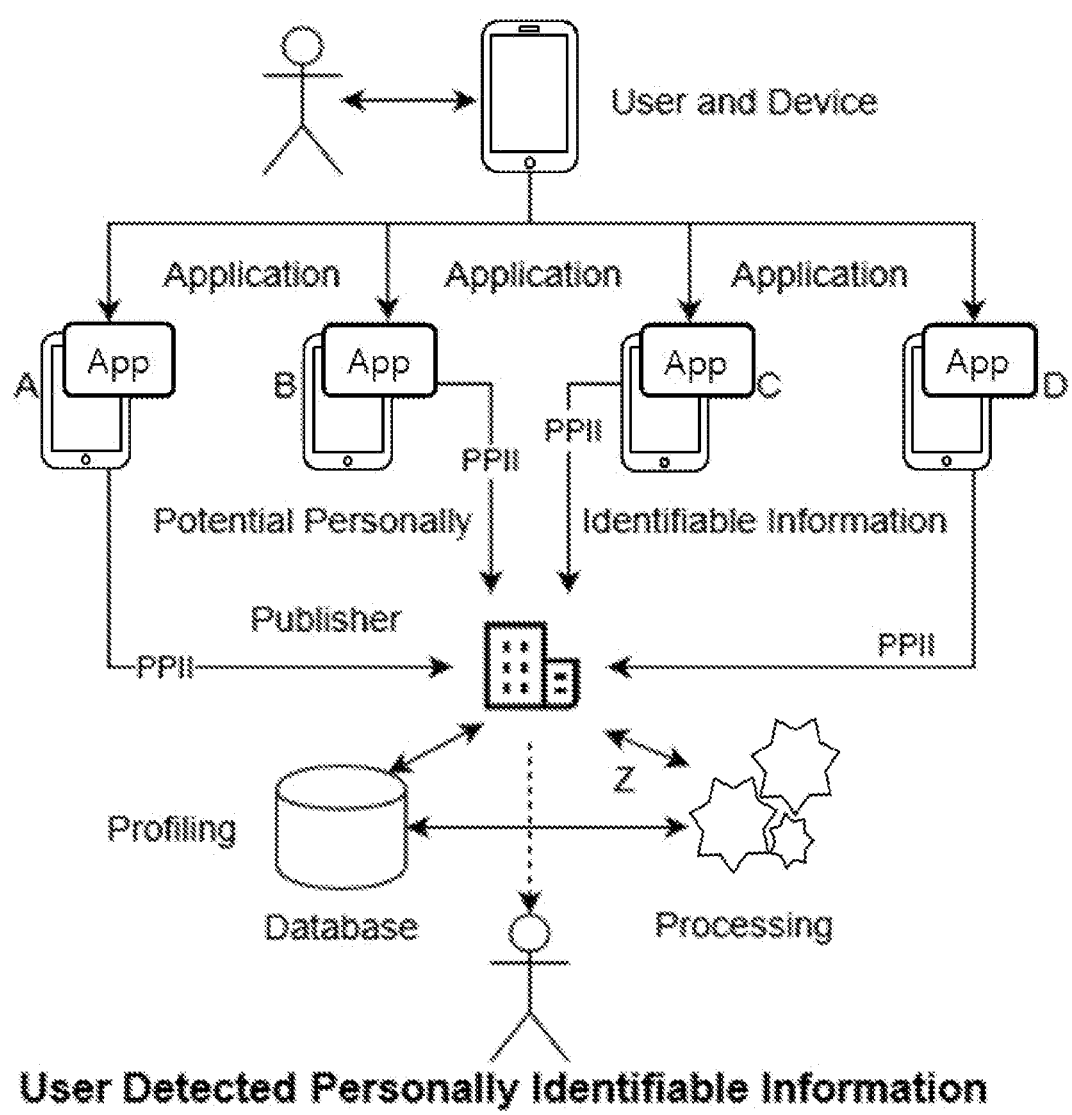
FIG. 2 is a drawing illustrating an example of gathering of personal identifiable information by publisher according to an example of embodiments.

FIG. 2 is a drawing illustrating an example of gathering of personal identifiable information by publisher according to an example of embodiments. FIG. 2 shows a user grants privacy permission to four separate apps (e.g., A, B, C and D). It is seen from FIG. 2 that Z is the publisher of all four apps. At this point, if that particular publisher Z processes data of its database for profiling, Z may achieve PII of that particular user.

D. Gathering of PII by Identical Organizations

Giant tech companies have multiple sub-organizations who are app publisher. The second proposition is, users that have given more of PPII on apps they download from a particular sub-organization or publisher whose parent organization is same. The users have also higher chance of revealing their PII. It is supposed that a set of parent organization is $Org_1$ to $Org_n$ that consist of sub-organization of $S\text{-}Org_1$ to $S\text{-}Org_n$. The above conjecture proposes that, if a set of PII is given to a sub-organization (or publisher) $S\text{-}Org_1$ are $PPII_1$ to $PPII_j$ through $App_1$ to $App_n$, then $S\text{-}Org_1$ actually gathers total $PPII_1$ to $PPII_j$ permission. Similarly, another set of information given to another sub-organization $S\text{-}Org_2$ are $PPII_k$ to $PPII_n$ through $App_1$ to $App_2$, then sub-$Org_2$ actually has $PPII_k$ to $PPII_n$. However, if parent organization of both $S\text{-}Org_1$ and $S\text{-}Org_2$ is $Org_1$, the $Org_1$ is capable of generating PII ($PII_1$ to $PII_n$) of that user. Total number of PPII given by a user $U_1$ may be calculated by the second factor, F2 obtained by the following Formula 2. In other words, total PPII provided to the organization $Org_1$ by the user $U_1$ may be calculated as below Formula 2.

$$\Sigma_{App=1}^{App=n} PPII + \Sigma_{S\text{-}Org=1}^{S\text{-}Org=n} PPII \qquad \text{[Formula 2]}$$

It is supposed that if probability of breaching individual PII through app permission $App_1$ to $App_n$ to $S\text{-}Org_1$ to $S\text{-}Org_n$ are $P_a(A), P_b(B), P_c(C) \ldots P_n(N)$. Then, the probability of breaching a particular PII due to collective app permission may be distributed as "$P_a(A)+P_b(B)+P_c(C)+ \ldots +P_n(N)$" or "$P_a(A) \cup P_b(B) \cup P_c(C) \cup \ldots \cup P_n(N)$".

Figure 3:
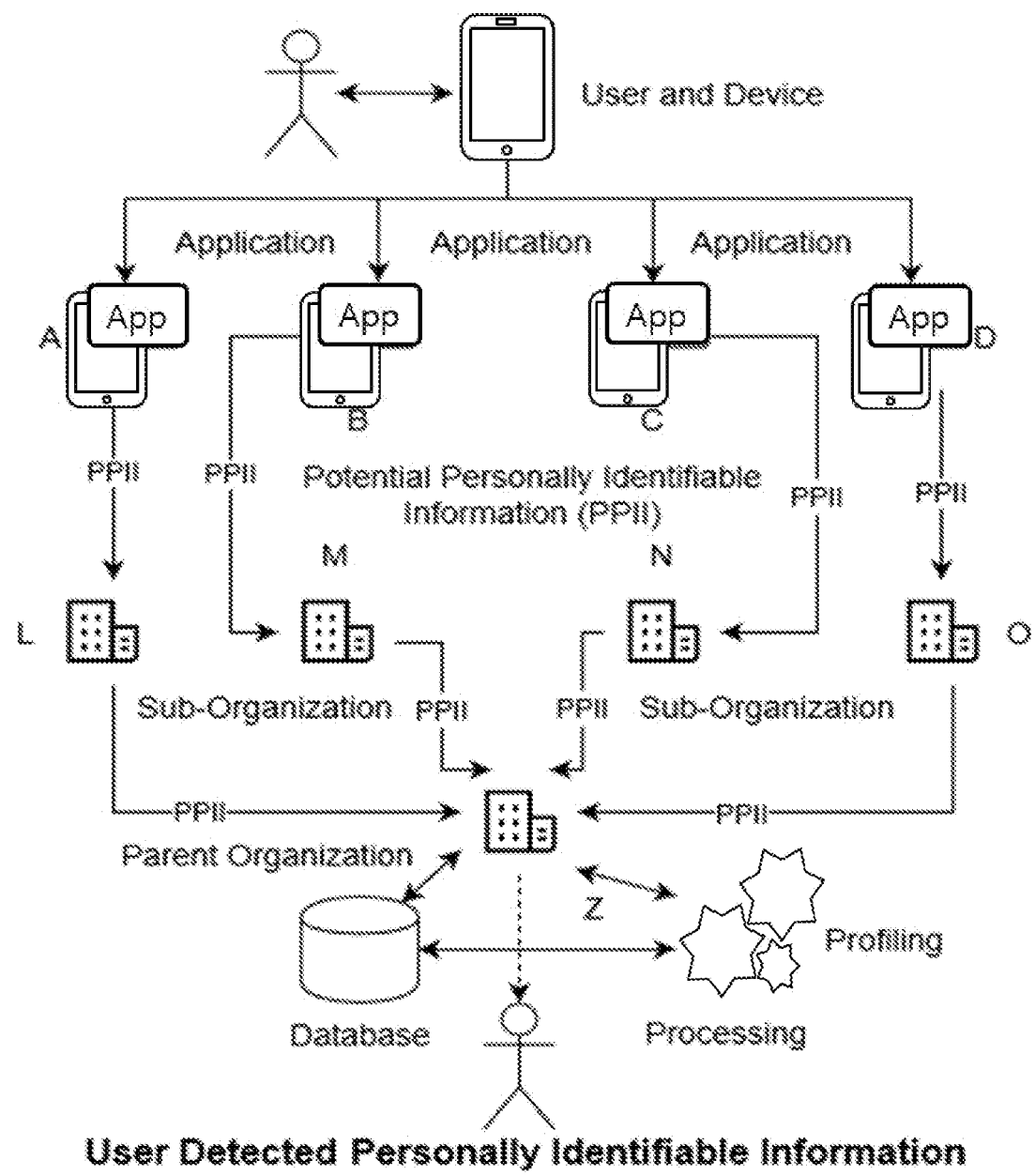
FIG. 3 is a drawing illustrating an example of gathering of personally identifiable information by organizations according to an example of embodiments.

FIG. 3 is a drawing illustrating an example of gathering of personally identifiable information by organizations according to an example of embodiments. FIG. 3 shows numbers of organizations (e.g., L, M, N and O) are publishing their apps via their sub-organizations app (A, B, C and D). While installing those apps, users are actually providing PPII with privacy permission. Finally, if that organization Z processes its data of achieved from app A to D for profiling, Z may achieve PII of that particular user.

E. PII Identification Risk Factor Assesment

Two new risk factors of PII breaching are identified in the following Formula 3. Here, other affecting factors termed as E (out of scope factors, error rate) may be utilized. In other words, total risk factor of an app may be determined with Influence Factor 1+Influence Factor 2+/−E (error rate) as below Formula 3. The error rate may consider frequency of use of an app or amount of usage data of the corresponding app, and the like.

$$\Sigma_{App=1}^{App=n} PPII + \Sigma_{App=1}^{App=n} PPII + \Sigma_{S\text{-}Org=1}^{S\text{-}Org=n} PPII \pm E \qquad \text{[Formula 3]}$$

3. Implementation and Result

A. Data Collection and Analysis

In the example embodiments, webscrapper.io, an open source Chrome extension tool, was used for scraping data from android play store. Used web scraper automatically visit specified web pages and dynamically create sitemap to extract required information from those pages accurately. In an example of embodiments, privacy information of all the apps published by two famous tech organizations (publisher) of Korea, Kakao and Naver, was extracted. Each entry of the dataset provides the permission needed for app installation includes the name of the parent organization, the name of publisher, name of the apps, individual dangerous permission. Gephi, an open source graph analysis software, was used for reflecting obtained results pictorially. Network graphs of FIGS. 4 to 9 are linked with personal information (PII and PPII) and associated applications flow.

B. Case Study 1-Kakao Group

Figure 4:
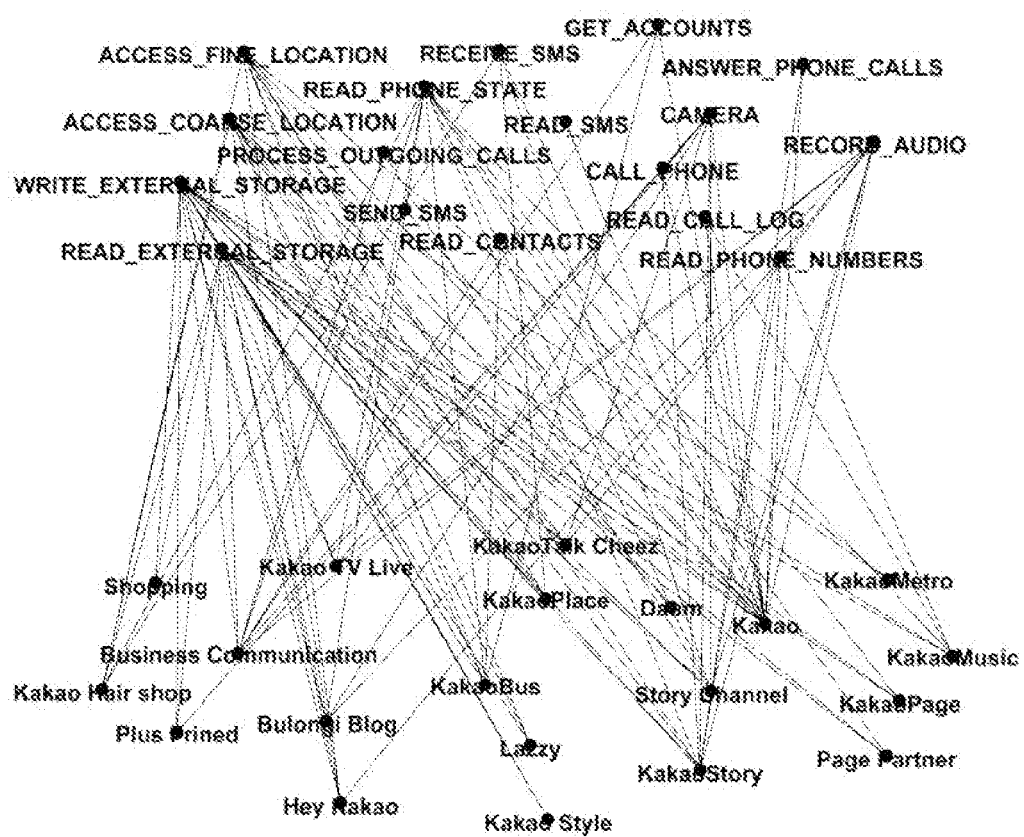
FIGS. 4 to 7 are drawings illustrating relation of top nodes representing application name and bottom nodes associated to privacy permission leakage through android app in case study 1 according to an example of embodiments.
Figure 5:
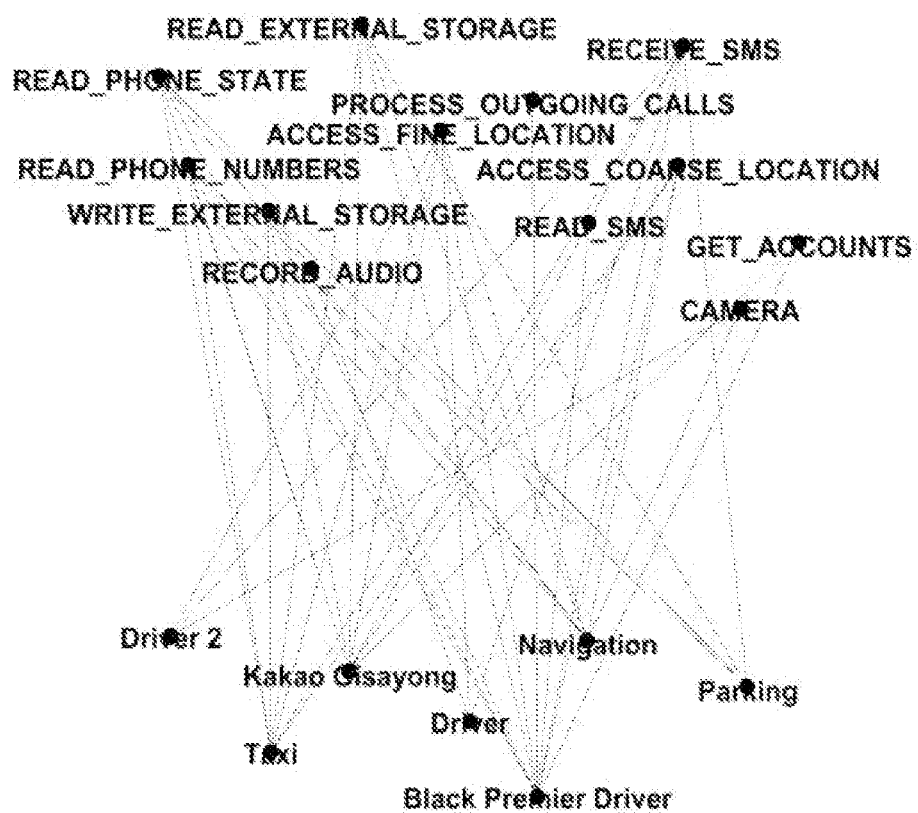
Figure 6:
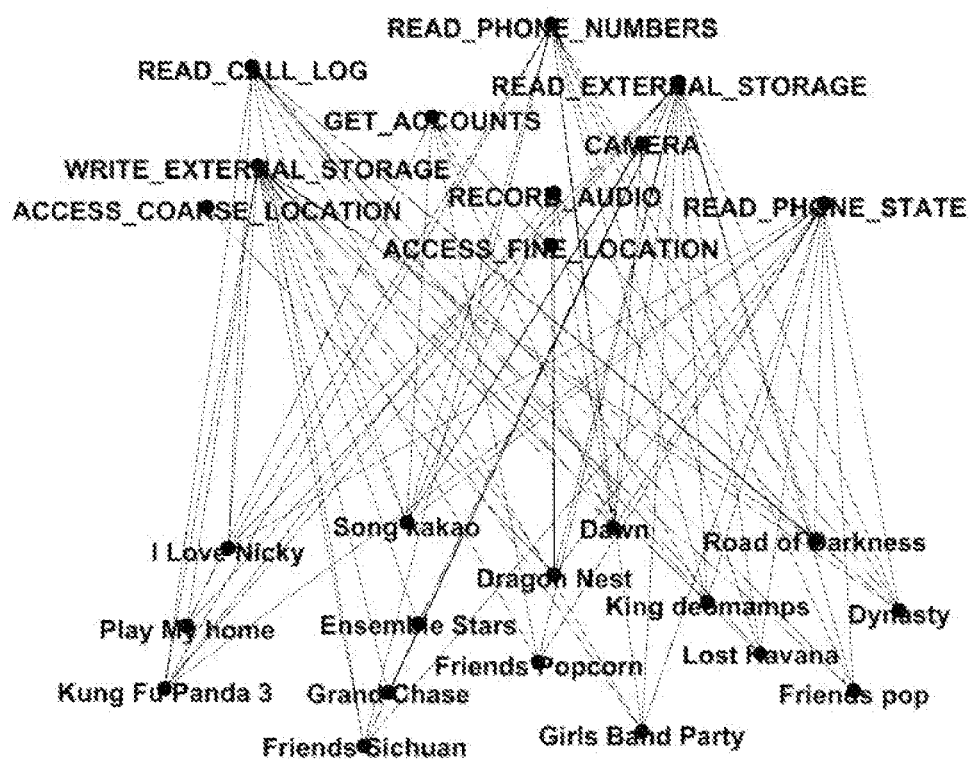
Figure 7:
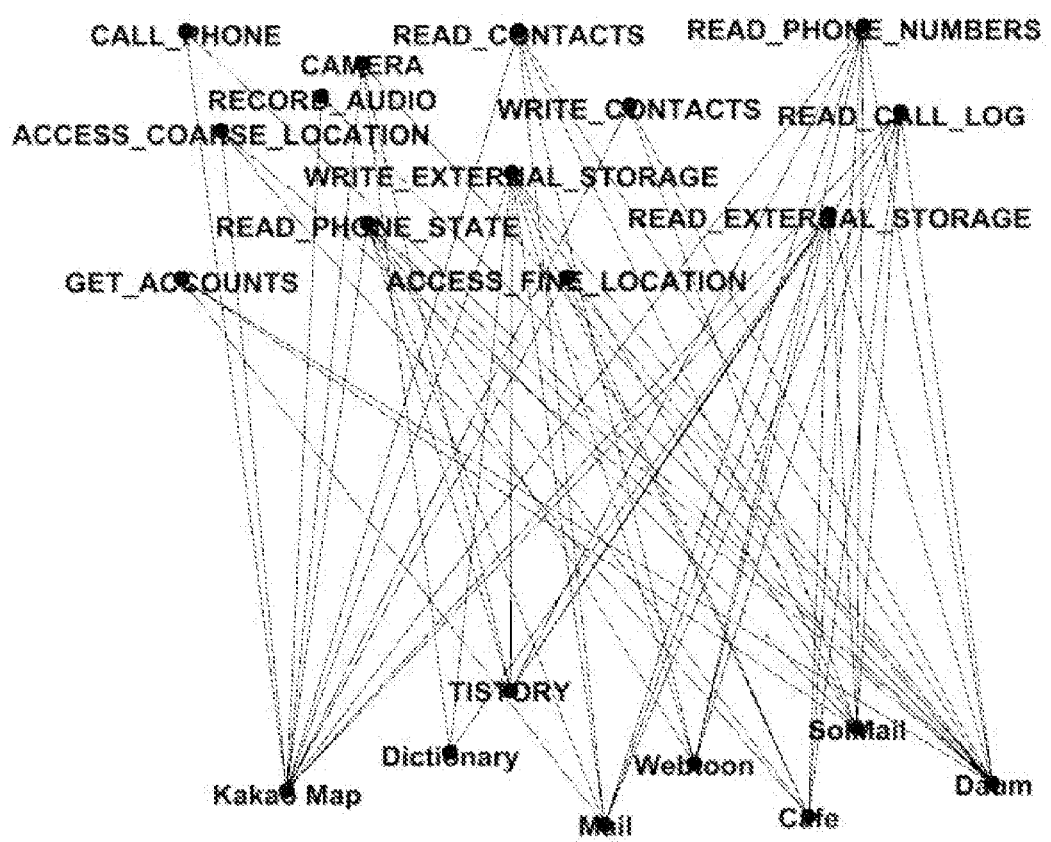

In FIGS. 4 to 7, the top nodes represent the apps name of Kakao group and bottom bodes states associated privacy permission leakage through android app. Except for Kakao theme, other publisher collected more than one dangerous permissions. FIG. 4 represents statement associated privacy permission leakage through apps of Kakao Corporation, FIG. 5 represents statement associated privacy permission leakage through apps of Kakao Mobility, FIG. 6 represents statement associated privacy permission leakage through apps of Kakao Game Corporation, and FIG. 7 represents statement associated privacy permission leakage through apps of Daum, parent company Kakao, respectively.

C. Case Study 2—Naver Group

Figure 8:
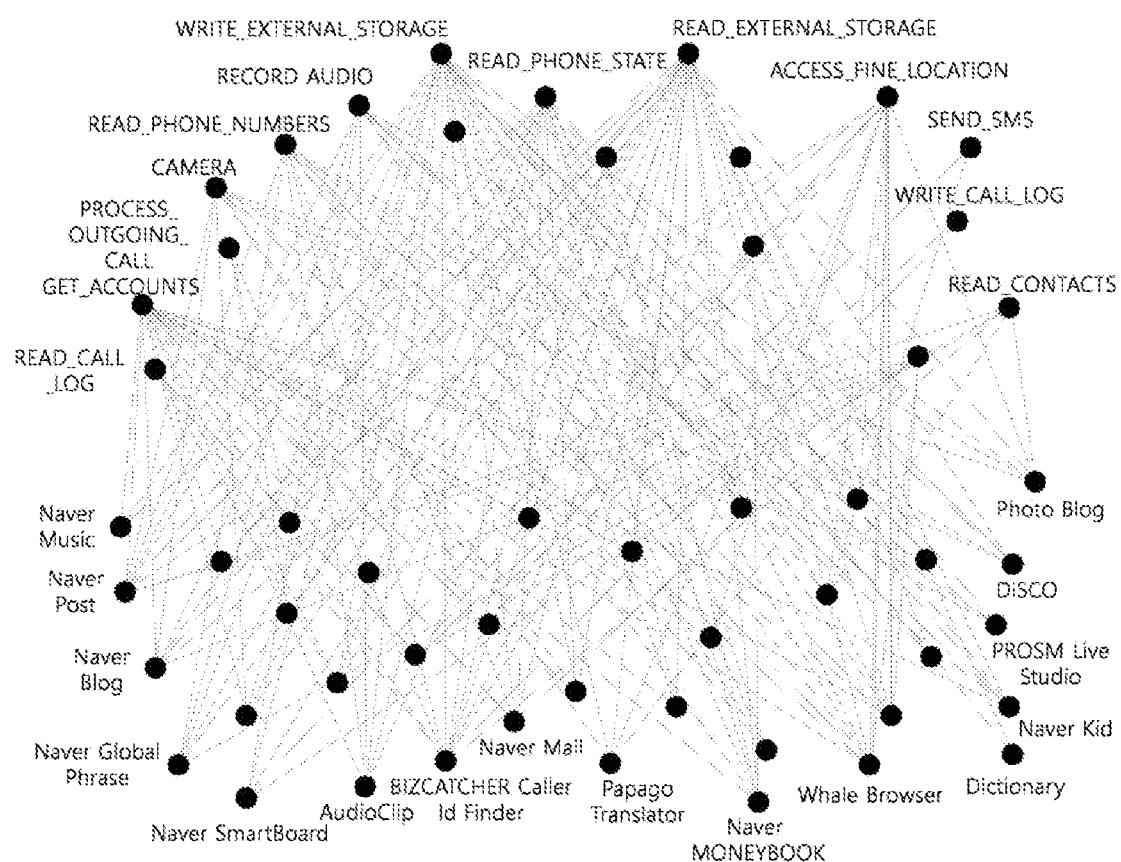
FIGS. 8 and 9 are drawings illustrating relation of upper portion indicating app permission and lower portion indicating app name in case study 2 according to an example of embodiments.
Figure 9:
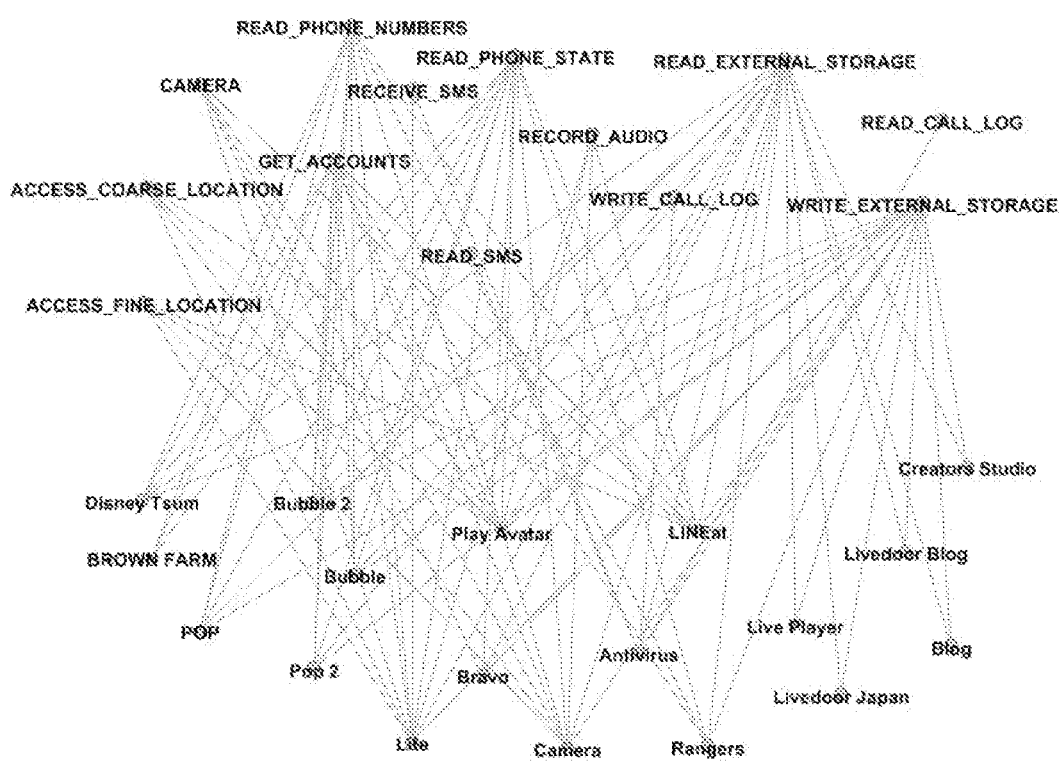

FIG. 8 represents Naver Corporation, and FIG. 9 represents Line, parent organization Naver. In FIGS. 8 and 9, the top nodes indicate app permission, and the bottom nodes indicate app name.

Figure 10:
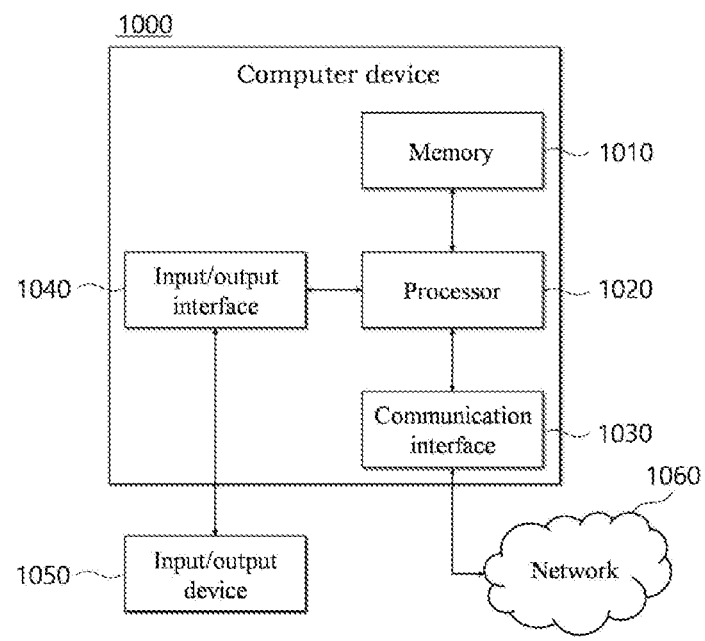
FIG. 10 is a drawing illustrating an example of internal configuration of computer device according to an example of embodiments.

FIG. 10 is a drawing illustrating an example of internal configuration of computer device according to an example of embodiments. The above described risk identification method may be performed by a computer device 1000 described in FIG. 10. The computer device 1000 may include a memory 1010, a processor 1020, a communication interface 1030, and input/output interface 1040, as illustrated in FIG. 10. The memory 1010 which is computer readable recording medium may include a permanent mass storage device such as RAM (random access memory), ROM (read only memory) and a disc drive. Here, the permanent mass storage device such as ROM and disk drive may be included in the computer device 1000 as a separate permanent storage device distinct from the memory 1010. Also, the memory 1010 may store OS and at least one program code. The software components may be loaded to the memory 1010 from computer-readable recording medium separate from the memory 1010. The separate computer-readable recording medium may include computer-readable recording medium such as a floppy drive, a disc, a tape, a DVD/CD-ROM drive, a memory card, and the like. In other example embodiments, the software components may be loaded to the memory 1010 through the communication interface 1030, not through the computer-readable recording medium. For example, the software components may be loaded to the memory 1010 of the computer device 1000 based on a computer program installed by files received through a network 1060.

The processor 1020 may be configured to process computer program instructions by performing basic arithmetic, logic, and input/output operation. The instructions may be provided to the processor 1020 by the memory 1010 or the communication interface 1030. For example, the processor 1020 may be configured to execute the instructions received according to a program code stored in a recording device such as the memory 1010.

The communication interface 1030 may provide a function for communicating the computer device 1000 with other devices (e.g., the above described devices) through the network 1060. For example, a request or an instruction, data, a file, and the like that the processor 1020 of the computer device 1000 generates according to a program code stored in a recording device such as the memory 1010 may be transmitted to other devices through the network 1060 according to control of the communication interface 1030. Conversely, a signal or an instruction, data, a file, and the like from other devices may be received to the computer device 1000 through the communication interface 1030 of the computer device 1000 by going through the network 1060. The signal or the instruction, data, and the like received through the communication interface 1030 may be transmitted to the processor 1020 or the memory 1010, and the file and the like may be stored in the storage medium (the above described permanent storage device) that the computer device 1000 may further include.

The input/output interface 1040 may be a means for interfacing with an input/output device 1050. For example, an input device may include a device such as a microphone, a keyboard or a mouse, etc., and an output device may include a device such as a display, a speaker, and the like. As another example, the input/output interface 1040 may be a means for interfacing with a device in which an input function and an output function are integrated into a single function such as a touch screen. The input/output device 1050 may be configured with the computer device 1000 as one device.

Also, in other example embodiments, the computer device 1000 may include much less or much more components than the components of FIG. 10. However, there is no need to clearly illustrate most prior art components. For example, the computer device 1000 may be implemented to include at least part of the described input/output device 1050 or further include other components such as a transceiver, a database, and the like.

Figure 11:
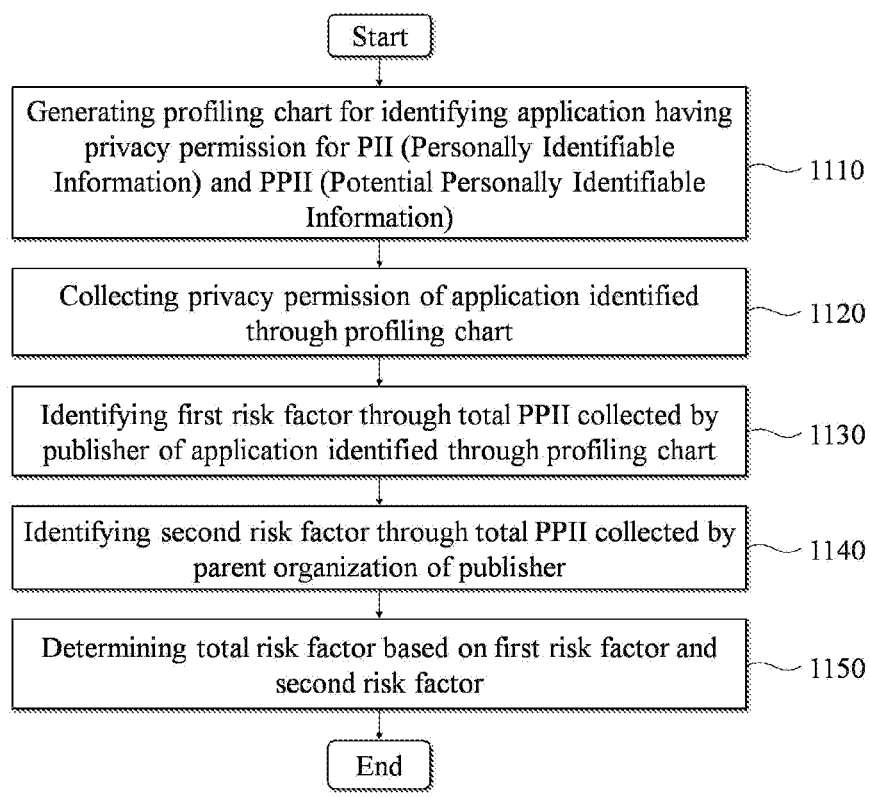
FIG. 11 is a flow chart illustrating an example of risk identification method according to an example of embodiments.

FIG. 11 is a flow chart illustrating an example of risk identification method according to an example of embodiments. The risk identification method according to an example of embodiments may be performed by the computer device 1000 described through FIG. 10. For example, the processor 1020 of the computer device 1000 may be implemented to execute control instructions according to OS code or at least one computer program code included in the memory 1010. Here, the processor 1020 may control the computer device 1000 in order that the computer device 1000 performs Steps 1110 to 1150 included in a method of FIG. 11 according to control instructions provided by a code stored in the computer device 1000.

In Step 1110, the computer device 1000 may generate a profiling chart for identifying an application having privacy permission for PII (Personally Identifiable Information) and PPII (Potential Personally Identifiable Information). As an example of embodiments, the computer device 1000 may generate a profiling chart for identifying an application having privacy permission corresponding to dangerous permission among normal, signature, and dangerous permission which are three protection levels affecting third-party app data access and collections in Android OS.

In Step 1120, the computer device 1000 may collect privacy permission of an application identified through the profiling chart. For example, the privacy permission of the application may be collected through e.g., app store. It is already described above that webscrapper.io, an open source Chrome extension tool, may be used for scraping data from android play store.

In Step 1130, the computer device 1000 may identify a first risk factor through total PPII collected by publisher of the application identified through the profiling chart. For example, the computer device 1000 may determine the total number of PPII given to applications included in an application group by a first user of a set of users as the first risk factor for the first user. The example of calculating the first risk factor through Formula 1 is already described above.

In Step 1140, the computer device 1000 may identify a second risk factor through total PPII collected by parent organization of the publisher. For example, the computer device 1000 may define the sum of the total number of PPII given to applications of the parent organization by the first user of the set of users and the total number of PPII given to applications of the publisher which is sub-organization of the parent organization by the first user as the second risk factor for the first user. The example of calculating the second risk factor through Formula 2 is already described above.

In Step 1150, the computer device 1000 may determine total risk factor based on the first risk factor and the second risk factor. For example, the computer device 1000 may determine the total risk factor based on error rate as the first risk factor, the second risk factor, and other influence factors. The example of calculating the total risk factor through Formula 3 is already described above.

Likewise, according to an example of embodiments, how collective permission gathering through multiple Android applications by same publishers may disclose user's PII by using two new PII risk factors may be explained, and total risk factor for PII may be determined.

The units described herein may be implemented using hardware components, software components, and/or a combination thereof. For example, a processing device may be implemented using one or more general-purpose or special purpose computers, such as, for example, a processor, a controller and an ALU (arithmetic logic unit), a digital signal processor, a microcomputer, a FPGA (field programmable gate array), a PLU (programmable logic unit), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied in any type of machine, component, physical or virtual equipment, computer storage medium or device to provide instructions or data to or be interpreted by the processing device. The software also may be distributed over network coupled computer systems so that the software is stored and executed in a distributed fashion. In particular, the software and data may be stored by one or more computer readable recording mediums.

The method according to the example embodiments may be implemented in a form of program instruction which may be performed through various computer means and recorded in computer-readable media. The media may also include, alone or in combination with the program instructions, data files, data structures, and the like. The media may be continuously storing a program which may be executed with a computer, or temporarily storing for execution or download. Also, the media may be various recording means or storing means in a form of single or a plurality of hardware which are combined, but it is not limited to a media directly accessed to any computer system, and it may be distributed on network. Examples of the media include magnetic media such as hard disks, floppy disks, and magnetic tape; optical media such as CD ROM disks and DVD; magneto-optical media such as floptical disks; and hardware devices that are specially configured to store and perform program instructions, such as ROM (read-only memory), RAM (random access memory), flash memory, and the like. Also, examples of other media include app store distributing applications or recording media and storing media managed in sites, servers, and the like distributing other many software. Examples of program instructions include both machine code, such as produced by a compiler, and higher level code that may be executed by the computer using an interpreter.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A risk identification method for PII (Personally Identifiable Information) comprising:
   generating, via a computer device, a profiling chart for identifying an application having privacy permission for PII and PPII (Potential Personally Identifiable Information);
   collecting privacy permission of an application identified through the profiling chart using the computer device;
   identifying a first risk factor using the computer device based on total PPII collected by publisher of the application identified through the profiling chart;
   identifying a second risk factor using the computer device, wherein the second risk factor is based on total PPII collected by parent organization of the publisher; and
   determining total risk factor based on the first risk factor and the second risk factor, wherein the total risk factor is determined by the computer device.

2. The risk identification method of claim 1, wherein the generating a profiling chart generates the profiling chart for identifying an application having privacy permission corresponding to dangerous permission among normal, signature, and dangerous permission which are three protection levels affecting third-party app data access and collections in Android OS.

3. The risk identification method of claim 1, wherein the identifying a first risk factor determines the total number of PPII given to applications included in an application group by a first user of a set of users as the first risk factor for the first user.

4. The risk identification method of claim 1, wherein the identifying a second risk factor determines the sum of the total number of PPII given to applications of the parent organization by the first user of the set of users and the total number of PPII given to applications of the publisher which is a sub-organization of the parent organization by the first user as the second risk factor for the first user.

5. The risk identification method of claim 1, wherein the determining total risk factor determines the total risk factor based on error rate as the first risk factor, the second risk factor, and other influence factors.

6. A non-transitory computer readable recording medium in which a computer program for executing the method of claim 1 in a computer device is recorded.

7. A computer device comprising at least one processor implemented to execute a computer readable instruction, and
   wherein the computer device, by the at least one processor:
   generates a profiling chart for identifying an application having privacy permission for PII (Personal Identification Information) and PPII (Potential Personally Identifiable Information),
   collects privacy permission of an application identified through the profiling chart,
   identifies a first risk factor based on total PPII collected by publisher of the application identified through the profiling chart,
   identifies a second factor based on total PPII collected by parent organization of the publisher, and
   determines total risk factor based on the first risk factor and the second risk factor, wherein the total risk factor is determined based on error rate as the first risk factor, the second risk factor, and other influence factors.

8. The computer device of claim 7, by the at least one processor, generating the profiling chart for identifying an application having the privacy permission corresponding to dangerous permission among normal, signature, and dangerous permission which are three protection levels affecting third-party app data access and collections in Android OS.

9. The computer device of claim 7, by the at least one processor, determining the total number of PPII given to applications included in an application group by a first user of a set of users as the first risk factor of the first user.

10. The computer device of claim 7, by the at least one processor, determining the sum of the total number of PPII given to applications of the parent organization by the first user of the set of users and the total number of PPII given to applications of the publisher which are sub-organizations of the parent organization by the first user as the second risk factor of the first user.

* * * * *